(No Model.)
I. F. STERLING.
CHURN DASHER.
No. 472,081. Patented Apr. 5, 1892.
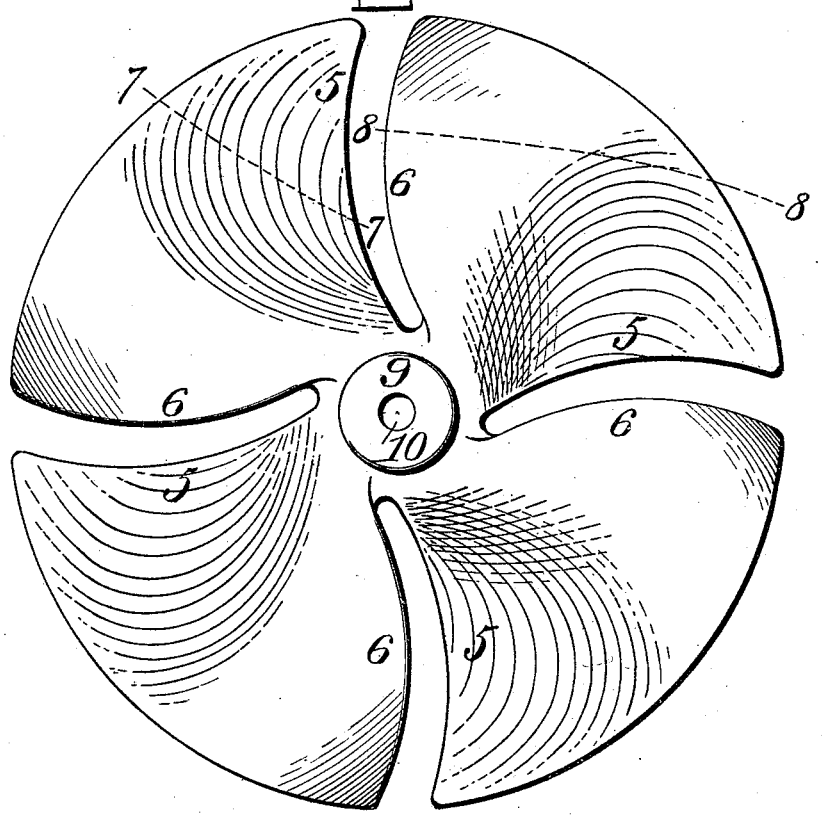
Fig. I.
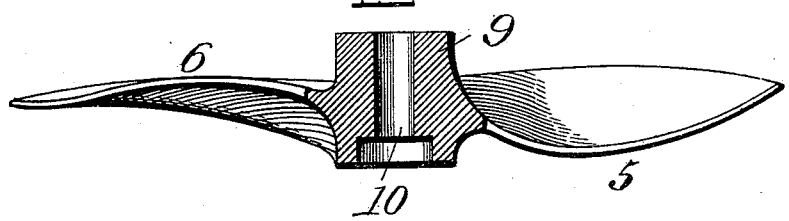
Fig. II.
WITNESSES.
INVENTOR.
Isaac F. Sterling.
By W. F. Stevens. Atty.
THE NORRIS PETERS CO., PHOTO-LITHO., WASHINGTON, D. C.

UNITED STATES PATENT OFFICE.

ISAAC F. STERLING, OF TEXARKANA, TEXAS.

CHURN-DASHER.

SPECIFICATION forming part of Letters Patent No. 472,081, dated April 5, 1892.

Application filed August 5, 1891. Serial No. 401,733. (No model.)

*To all whom it may concern:*

Be it known that I, ISAAC F. STERLING, a citizen of the United States, residing at Texarkana, in the county of Bowie and State of Texas, have invented certain new and useful Improvements in Churn-Dashers; and I do hereby declare the following to be a full, clear, and exact description of the invention, such as will enable others skilled in the art to which it appertains to make and use the same.

This invention relates to reciprocating churn-dashers with rotary heads.

As a result of a great many experiments which I have made with different styles of churn-dashers of the revolving-head class I conclude that the centrifugal force of the cream when set in motion by the revolving head tends to crowd or throw the cream outward from center beyond the action of the dasher-arms, and that if a dasher could be made whose rotation in the act of vertical reciprocation would direct the cream to flow in currents toward the center then the greatest possible agitation would be given to the cream, because the dasher must crowd the cream outward, while the natural currents thereof are inward.

To accomplish this object my invention consists in a churn-dasher having blades of a peculiar screw-propeller shape, as hereinafter described and claimed, reference being had to the accompanying drawings, in which—

Figure I represents the top side of a churn-dasher according to my invention; and Fig. II shows a vertical section of the same through the hub and with the blades beyond, as seen edgewise.

It is a fact well known to those skilled in such matters that water and other fluids when forcibly ejected from a nozzle or other guiding means will take its direction of issue from the direction of the lips of the last guide which acts on it before it is set free wholly independent of the curves or crooks around which the water may have traveled in reaching said final guide. Operating upon this principle the lips of each concave in the blades of my dasher are inclined toward center to deliver the main currents of cream toward center, and the curved edges of the lips, forming apertures between them in a general radial direction, are nevertheless both tangent at their inner ends to the hub.

If the dasher be pushed downward, 5 represents the front or cutting edge of each blade, and 6 the rear edge or delivery-lip; but if the dasher be raised the conditions are reversed. On the downward passage the small area of each blade projecting beyond line 7 tends to wedge the cream outward; but the action of the rest of the blade is to deliver the cream toward center from the lips 6, and on the upward passage the small area of the blade outside of line 8 wedges the cream outward, while the rest of the blade guides it from the delivery-lip 5 toward center. The lips 5 and 6 of the same blade are concave on opposite faces, the one above and the other below, and the direction of each concavity inclines toward the center of the dasher. Both edges of each blade are curved, one concave and the other convex, and the inner ends of both curves are tangent to the hub 9 of the dasher.

This dasher may be mounted by means of its central hole 10 in any usual manner to revolve upon a handle, so that vertically reciprocating the dasher on its handle in a churn of cream will cause the dasher to revolve therein, producing currents which tend toward center by both movements and causing great agitation by the dasher-body breaking up those currents.

Having thus fully described my invention, what I believe to be new, and desire to secure by Letters Patent, is the following:

The churn-dasher herein described and shown, having a central hub and a series of radial blades whose circumferential edges are substantially in a plane at right angles to the axis of revolution, each blade having two edges, which are substantially radial, one of the said radial edges 5 being concave and the other edge 6 being convex, the upper face of the edge 5 being concave and its lower face convex, while the upper face of the opposite edge 6 is convex and its lower face concave, the concavities of both faces inclining toward the center, whereby when the dasher is forced in either direction through the cream it is thereby caused to rotate and to draw the cream toward the center.

In testimony whereof I affix my signature in presence of two witnesses.

ISAAC F. STERLING.

Witnesses:
C. A. HOOKS,
M. D. TILSON.